(12) United States Patent
Morrison

(10) Patent No.: US 11,222,550 B1
(45) Date of Patent: Jan. 11, 2022

(54) PHOSPHORESCENT WRITING SHEET AND SYSTEM FOR CREATION OF GLOWING TRACES AND METHODS THEREOF

(71) Applicant: Amanda Autumn Morrison, Bullhead City, AZ (US)

(72) Inventor: Amanda Autumn Morrison, Bullhead City, AZ (US)

(*) Notice: Subject to any disclaimer, the term of this patent is extended or adjusted under 35 U.S.C. 154(b) by 289 days.

(21) Appl. No.: 16/504,282

(22) Filed: Jul. 7, 2019

Related U.S. Application Data

(60) Provisional application No. 62/694,979, filed on Jul. 7, 2018.

(51) Int. Cl.
| | | |
|---|---|---|
| G09B 11/06 | (2006.01) | |
| G09F 13/20 | (2006.01) | |
| G09B 11/00 | (2006.01) | |
| B42D 15/00 | (2006.01) | |
| B42D 25/41 | (2014.01) | |
| B42D 25/40 | (2014.01) | |
| B42D 25/22 | (2014.01) | |
| B42D 25/00 | (2014.01) | |
| F21K 9/64 | (2016.01) | |
| F21Y 115/10 | (2016.01) | |

(52) U.S. Cl.
CPC .............. G09B 11/06 (2013.01); B42D 15/00 (2013.01); B42D 15/0086 (2013.01); B42D 15/0093 (2013.01); B42D 25/00 (2014.10); B42D 25/22 (2014.10); B42D 25/40 (2014.10); B42D 25/41 (2014.10); F21K 9/64 (2016.08); G09B 11/00 (2013.01); G09F 13/20 (2013.01); *F21Y 2115/10* (2016.08)

(58) Field of Classification Search
CPC ......... G09B 11/06; G09B 11/00; G09F 13/20; B42D 15/0093; B42D 15/0086; B42D 15/00; B42D 25/41; B42D 25/40; B42D 25/22; B42D 25/00; F21K 9/64; F21Y 2115/10
USPC ............. 40/1, 541, 542, 544, 546, 714, 716; 283/67, 70, 72, 74, 94, 98, 901; 434/162, 434/170
See application file for complete search history.

(56) References Cited

U.S. PATENT DOCUMENTS

| | | |
|---|---|---|
| 3,443,332 A | 5/1969 | Christy |
| 3,978,340 A * | 8/1976 | Schroeder ............... B43L 3/002 250/462.1 |
| 4,590,381 A | 5/1986 | Mendelson |

(Continued)

*Primary Examiner* — Justin V Lewis
(74) *Attorney, Agent, or Firm* — Connie R. Masters

(57) ABSTRACT

A phosphorescent writing sheet and system along with methods of production and use are provided. The writing/drawing system includes a writing sheet and a light source. The writing sheet includes a generally transparent substrate sheet or film, phosphorescent paint, and a generally transparent covering sheet or film. To create the writing sheet, a thin layer of the phosphorescent paint is deposited onto the inner surface of the substrate. When the paint is dry, the covering sheet is positioned above the paint layer. The layers are then laminated to adhere the substrate layer to the covering layer with the paint enclosed between them to form the transparent or translucent writing sheet. To use, the light source is run along either the front or back outer surface to create a track, which triggers the phosphorescent paint to luminesce to create glowing traces along the track of the light source.

17 Claims, 11 Drawing Sheets

(56) References Cited

U.S. PATENT DOCUMENTS

| | | |
|---|---|---|
| 6,878,306 B2 | 4/2005 | Gao |
| 7,249,431 B1 | 7/2007 | Rose et al. |
| 2007/0060013 A1 | 3/2007 | Schmidt et al. |
| 2011/0095232 A1* | 4/2011 | Mahany ................ C09K 11/02 |
| | | 252/301.36 |
| 2011/0189921 A1 | 8/2011 | Andersen |
| 2013/0102222 A1 | 4/2013 | Clark |

* cited by examiner

PHOSPHORESCENT WRITING SHEET AND SYSTEM FOR CREATION OF GLOWING TRACES AND METHODS THEREOF

CROSS-REFERENCE TO RELATED APPLICATIONS

This nonprovisional application claims the benefit of U.S. Provisional Patent Application Ser. No. 62/694,979, filed on Jul. 7, 2018, which is incorporated herein in its entirety.

FIELD OF INVENTION

This invention relates generally to writing materials, and, more particularly, to a phosphorescent writing sheet that, when activated by a handheld light, luminesces to produce a temporary trailing glowing trace and that is usable to enhance learning activities and to provide entertainment.

BACKGROUND OF THE INVENTION

Children spend a substantial amount of time learning. Though teachers attempt to make the lessons interesting, a child may find the lessons boring or tedious. One way to reignite interest is to introduce a new learning aid, because the newness grabs the attention of the student and re-engages the student in the lesson. A hands-on learning aid is particularly effective, since using multiple senses causes the child to be more focused, to learn more easily, and to retain more of what they are learning.

In learning to write and to spell, a child repetitively practices writing letters and words—usually with a pencil and paper. To provide variety, a teacher may allow the child to write the words on a chalk board, may let the child type the words on a computer, or may provide a white board and dry erase marker for practicing. However, all these writing mechanisms are well known to a child; thus, they do not provide a high level of interest and engagement. It would be advantageous to provide a new and fun writing system that piques a child's curiosity to increase involvement with the writing practice.

For use in a classroom of students, multiple writing systems would be needed. Thus, ideally, the writing system would be inexpensive to purchase in quantity, durable for student use, and easy to store in multiples, as well as encouraging learning.

For use as a toy or entertainment device, parents also desire durability, ease of storage, and low-cost.

Accordingly, there is a need for a novel writing material that is economical to manufacture and ship, is easy to store, is long-lasting, is transportable, does not have a number of small parts that are easy to lose, and provides a fun, new way to practice writing or to enjoy drawing.

BRIEF SUMMARY OF THE INVENTION

The present invention is directed to a phosphorescent writing sheet, to a writing system using the writing sheet, and to methods of production and use. The phosphorescent writing system includes the novel multi-layer writing sheet having an interior layer of phosphorescent paint and a conventional handheld light source. The light source is lightly pressed against the front or back surface of the writing sheet, which activates the phosphorescent paint to emit light, thereby creating a glowing trail of writing following the path of the light source. Though discussed herein as a tool for writing, the writing sheet is equally suitable for drawing, sketching, scribbling, or similar activities.

The multi-layer writing sheet is formed from a generally transparent first sheet (referred to as a "substrate sheet"), a thin layer of phosphorescent paint, and a generally transparent second sheet (referred to as a "covering sheet"). To create the writing sheet, a thin layer of the phosphorescent paint is deposited onto the inner surface of the substrate sheet and allowed to dry. After the paint dries, the covering sheet is positioned on top of the paint to create the three layers—the substrate layer, the paint layer, and the covering layer. The three layers are then laminated with the paint confined between the substrate and covering sheets to create a thin and relatively transparent or translucent form, piece, plate, leaf, folio, sheet, flexible pane, or slab, which is termed herein a "sheet."

In the aspect in which the phosphorescent writing sheet is reversible, a user slides a light source over either the outer surface of one side of the writing sheet, i.e. over the substrate side or the covering side. The enclosed phosphorescent paint phosphoresces to create a glowing trace of writing or drawing along the track taken by the light source. The track may be a dot, multiple dots, an elongated straight or curved line, a shape, a mark, a stroke, or other similar manually-created depiction.

In one exemplary use, the phosphorescent writing or drawing tool furnishes teachers with a new tool for teaching writing, practicing printing or cursive handwriting, word review, spelling practice, and the like. Students are more engaged using this new and interesting tool and are more interested in the lessons.

In a second exemplary use, the phosphorescent writing sheet can be an entertainment device. A user can draw interesting shapes or images with the light source. Due to the durability and to the compact size of both the writing sheet and the light source, and because there are only the two pieces—the writing sheet and light source—the writing system is very transportable. Thus, a child could easily play with the writing system while on a car road trip or on an airplane. Since the glowing trace glows for only a limited amount of time (from seconds to a few minutes), there is no need for erasure, and the writing sheet can be reused repeatedly and indefinitely.

The phosphorescent writing sheet is thin and compact. For example, a stack of 90-110 phosphorescent writing sheets might be only 1.25 inches tall—less than the height of a ream of five hundred sheets of paper. Thus, the sheet is easy and efficient for the teacher or consumer to store, for a parent to pack for a trip, and for a manufacturer to ship.

Additionally, the phosphorescent writing sheet is economical to produce due to the fact that there are few components, the components are not expensive, the shipping is inexpensive due to the compact form factor, and the method of production is not complicated or costly.

In one aspect of the invention, the phosphorescent writing sheet is formed by using laminating pouches.

In another aspect of the invention, the writing sheet is formed by using roll lamination material.

In an additional aspect of the invention, hot lamination is used to seal the substrate sheet to the covering sheet.

In a further aspect of the invention, cold lamination is used to seal the substrate sheet to the covering sheet.

In another aspect of the invention, the phosphorescent paint comprises silver-activated zinc sulfide.

In a further aspect of the invention, the phosphorescent paint comprises doped strontium aluminate.

In another aspect of the invention, the phosphorescent paint is a glow-in-the-dark fabric paint.

In a further aspect of the invention, the writing sheet is reversible.

In another aspect of the invention, the writing sheet is nonreversible.

In an additional aspect of the invention, the phosphorescent paint is applied to both the substrate sheet and the covering sheet.

In a further aspect of the invention, the phosphorescent paint is applied to only the substrate sheet.

In another aspect of the invention, the substrate sheet and the covering sheet are formed of different materials.

In an additional aspect of the invention, the substrate sheet and the covering sheet are formed of the same material.

In another aspect of the invention, the substrate sheet and/or the covering sheet are formed of a single type of plastic material.

In an additional aspect of the invention, the substrate sheet is formed of one type of plastic material and the covering sheet is formed a different type of plastic material.

In a further aspect of the invention, the substrate sheet and/or the covering sheet are formed of a combination of multiple types of plastic material.

The object of the invention is to provide a writing sheet and system, along with a method of use and a method of manufacturing that gives an improved performance over the above described prior art systems and methods.

These and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

Like reference numerals refer to like parts throughout the several views of the drawings.

DETAILED DESCRIPTION OF THE INVENTION

Shown throughout the figures, the present invention is directed toward a phosphorescent writing sheet, toward a writing system comprising the writing sheet in combination with a light source, toward a method of production of the writing sheet, and toward a method of use of the writing sheet in which the light source creates a glowing trail on the surface of the writing sheet.

Figure 1:
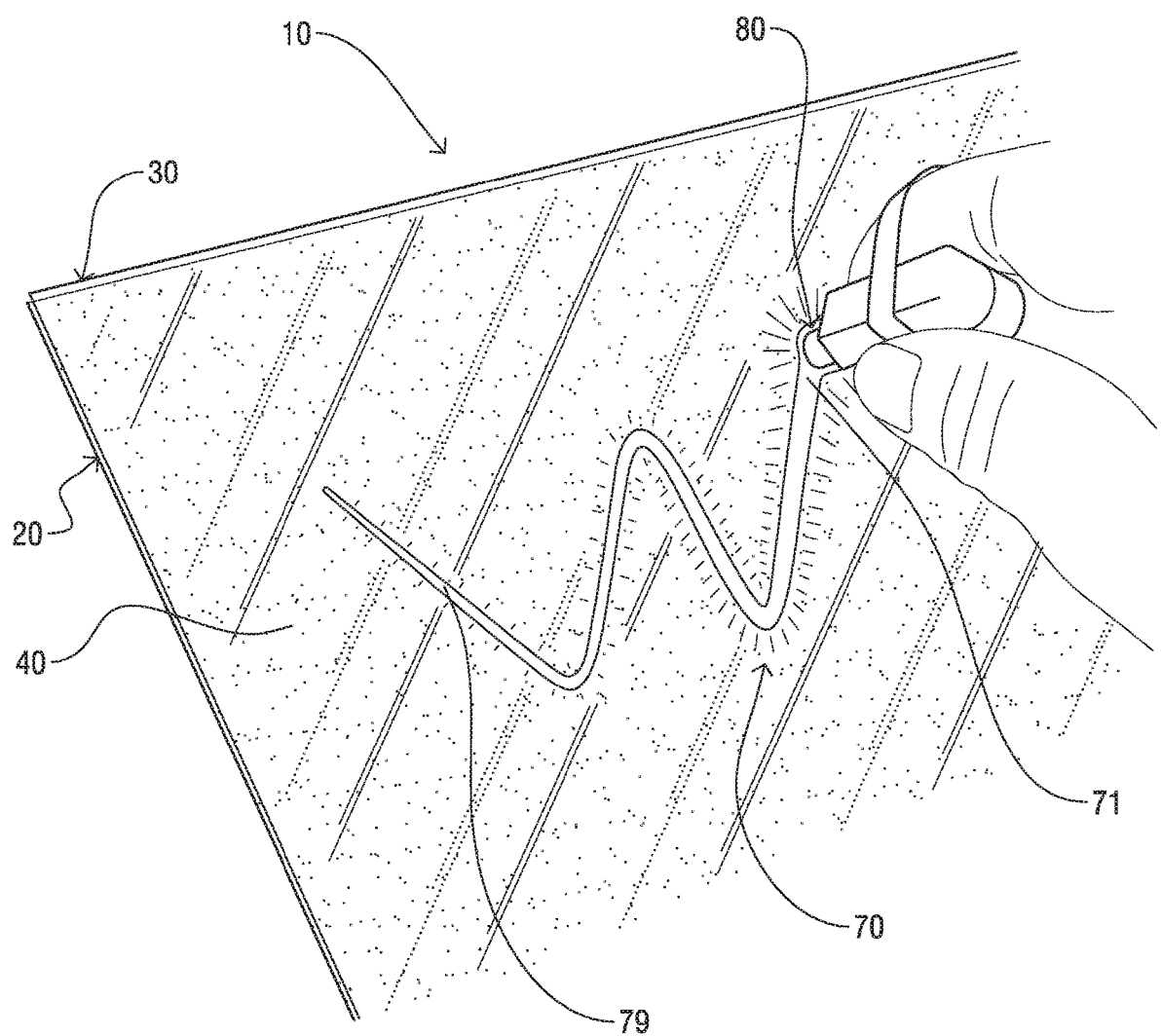
FIG. 1 is a perspective view of an embodiment of the phosphorescent writing and/or drawing sheet and system for creation of glowing traces of the present invention illustrating a light source of one aspect of the invention and illustrating the method of use.

Referring now to FIG. 1, the writing system, which includes the writing sheet 10 in combination with a light source 80, is illustrated in accordance with a preferred embodiment of the present invention. The writing sheet 10, which in the preferred aspect of the invention is reversible in use, comprises a bottom substrate layer 20, a middle phosphorescent paint deposit layer 40, and a top covering layer 30. In FIG. 1, the light source 80 is being moved along the surface of the substrate 20 or of the covering 30 to activate the phosphorescent paint 40, causing the phosphors in the phosphorescent paint to luminesce to create a visually appealing glowing trace 70.

The glowing trace 70 is brighter in areas 71 nearer the light source 70 and fades to a lighter glow at the areas 79 that are further from the light source 70. To allow quick re-use of the writing sheet, the glow only lasts a limited length of time, which may be from seconds to a few minutes. In an aspect, the glow of the tracing lasts under 20 seconds. In another aspect, the glow of the tracing lasts under 10 seconds. The length of time that the glowing trace can be optically viewed may be increased or decreased based on design factors such as the thickness of the materials used for the substrate 20 and covering 30, the type of plastic materials used for the substrate 20 and covering 30, the strength (and/or color) of the beam of light emitted by the light source 80, the density of the phosphorescent paint applied to the substrate 20, the type of phosphorescent paint, the speed of movement of the light source 80 along the surface of the tool 10, and other similar factors.

Figure 5:
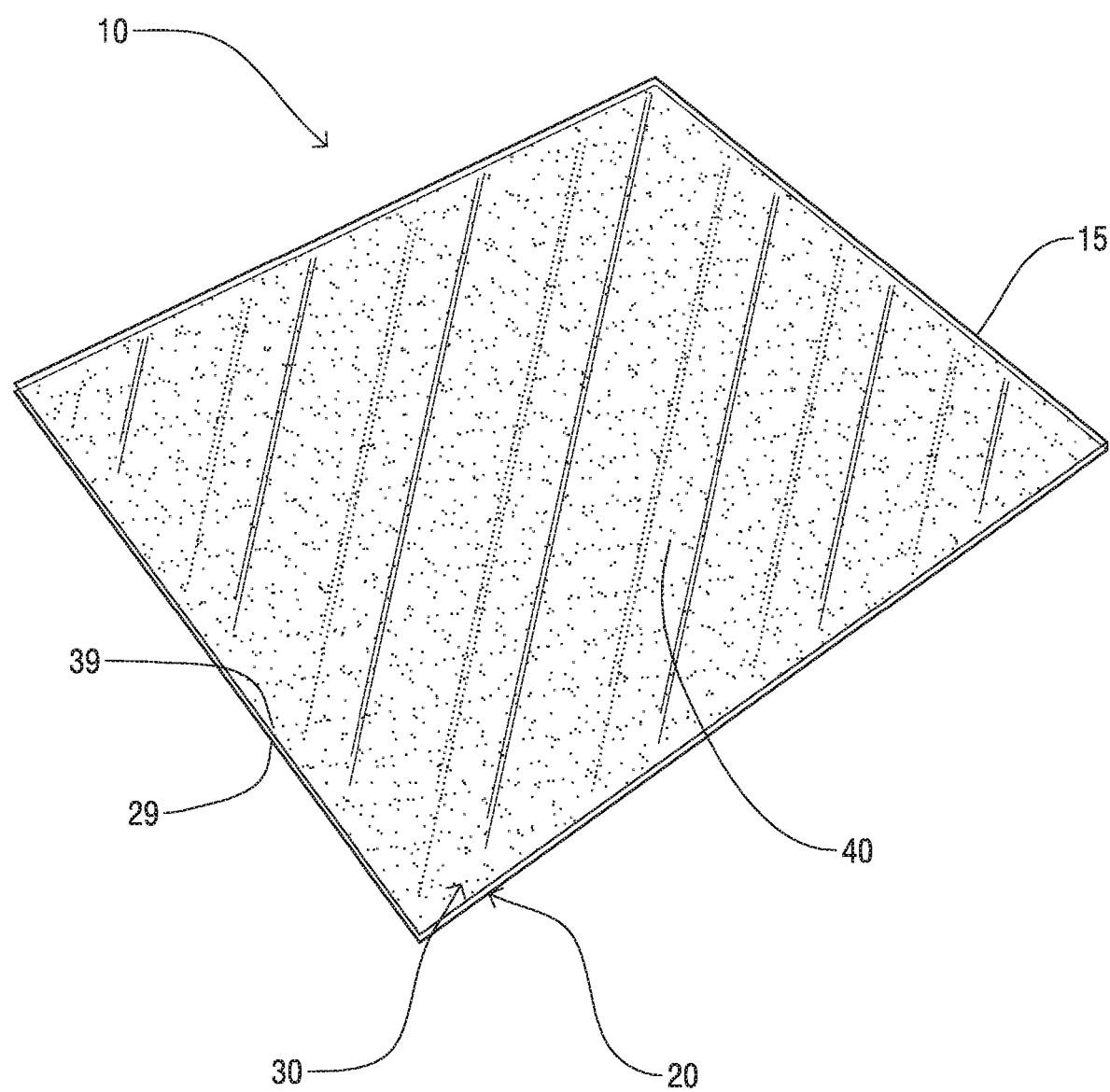
FIG. 5 is a perspective view of an embodiment of the phosphorescent writing sheet of the present invention showing a completed writing sheet.
Figure 6:
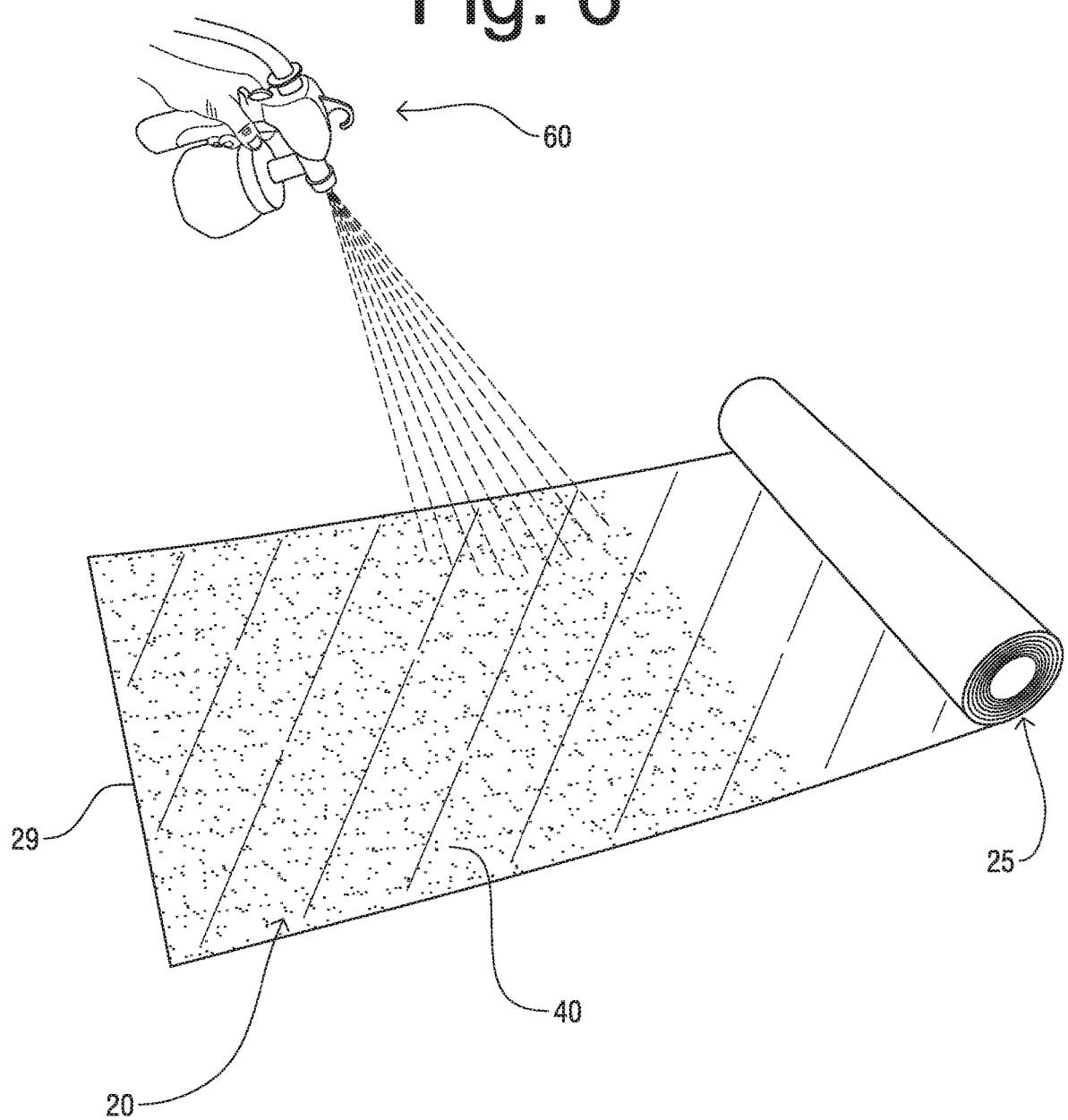
FIG. 6 is a perspective view of an embodiment of the phosphorescent writing sheet of the present invention showing a step in creation of the writing sheet from a roll substrate.
Figure 7:
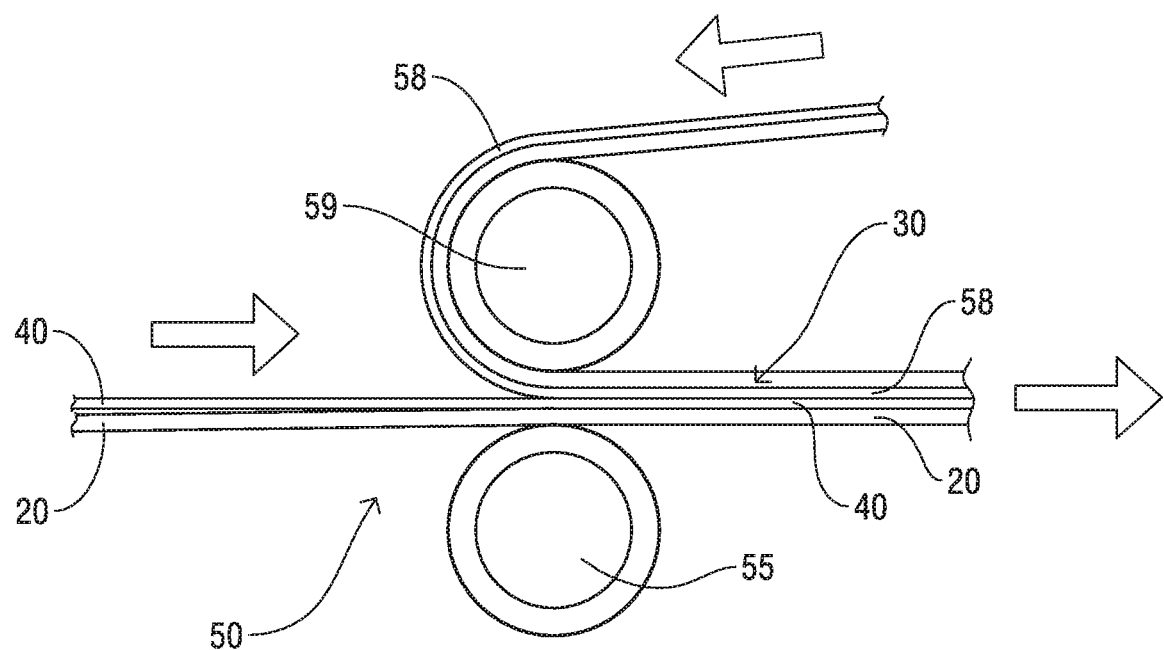
FIG. 7 is a diagram illustrating an exemplary method of producing the phosphorescent writing sheet of the present invention from a roll substrate using a hot lamination production method (not to scale).
Figure 8:
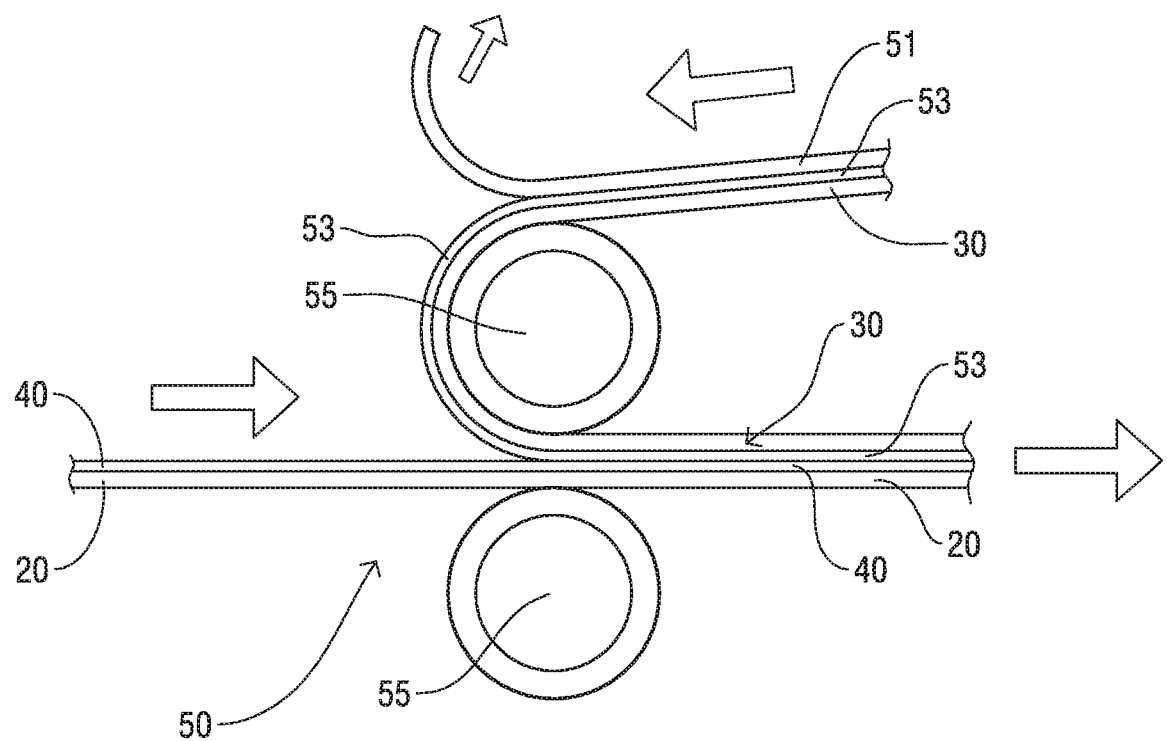
FIG. 8 is a diagram illustrating another exemplary method of producing the phosphorescent writing sheet of the present invention from a roll substrate using a cold lamination production method (not to scale).

Exemplary methods of formation or production are presented. FIGS. 2-5 illustrate the first production method, which uses laminating pouches and may use hot or cold lamination to seal the pouch containing the paint deposit. FIGS. 6-7 illustrate the second production method, which uses roll laminating film and hot lamination. FIGS. 6, 8 illustrate the third production method, which uses roll laminating film and cold lamination.

Figure 2:
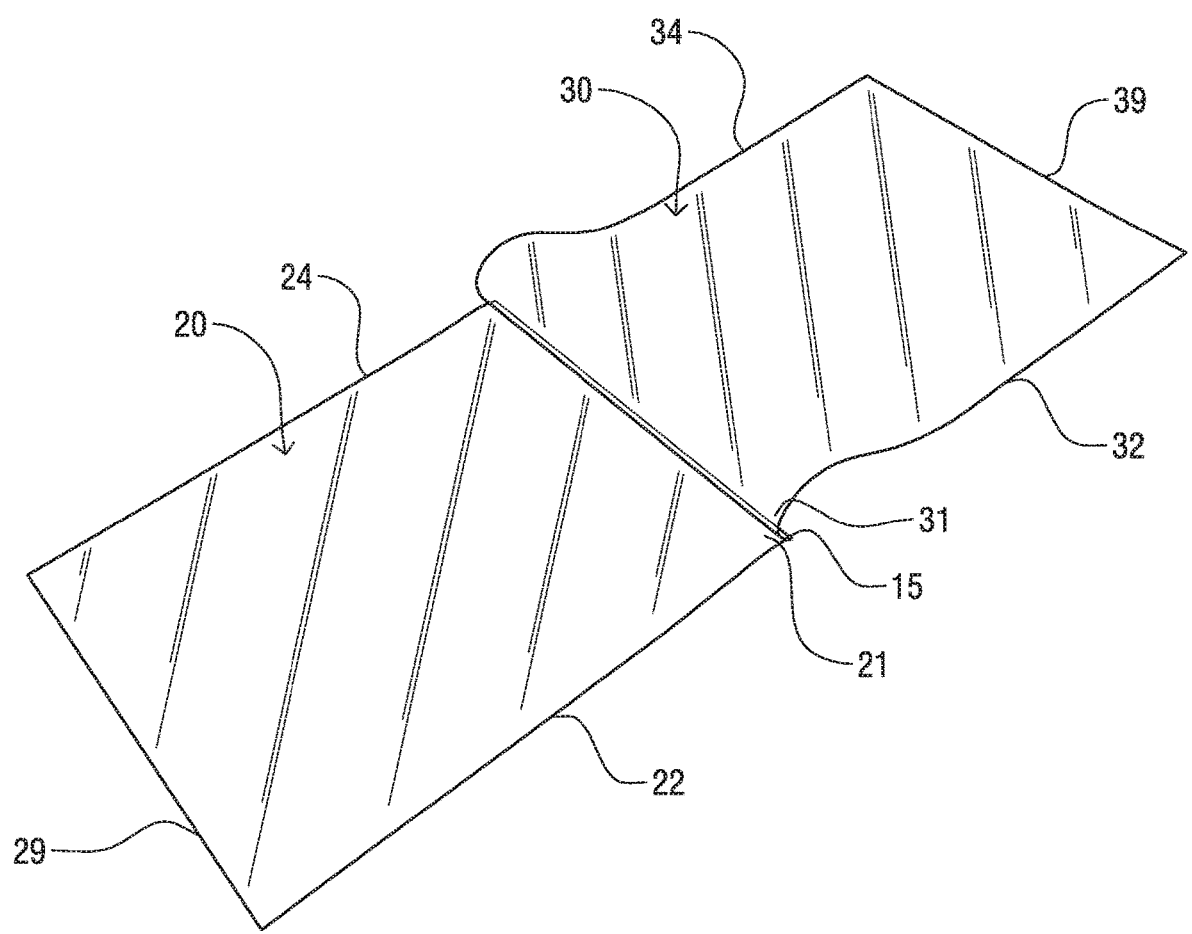
FIG. 2 is a perspective view of an embodiment of the phosphorescent writing drawing sheet of the present invention showing a step in one aspect of the creation of the writing/drawing sheet.

Turning to the first exemplary production method, FIG. 2 shows an open laminating pouch ready to receive the phosphorescent paint. The laminating pouch comprises a bottom or back portion 20 (the substrate sheet) and a top or front portion 30 (the covering sheet). The substrate sheet 20 extends longitudinally from the edge of the proximal portion 21 to the edge of the distal portion 29 and extends laterally from the first lateral edge 22 to the second lateral edge 24. The covering sheet 30 extends longitudinally from the edge of the proximal portion 31 to the edge of the distal portion 39 and extends laterally from the first lateral edge 32 to the second lateral edge 34. The edge of the substrate proximal portion 21 of substrate sheet 20 is attached to the edge of the covering proximal portion 31 at seam or edge juncture 15. The substrate sheet 20 and the covering sheet 30 have a thickness between 1 mil and 8 mils and, preferably, have a thickness of between 1.5 mils and 3 mils.

Figure 3:
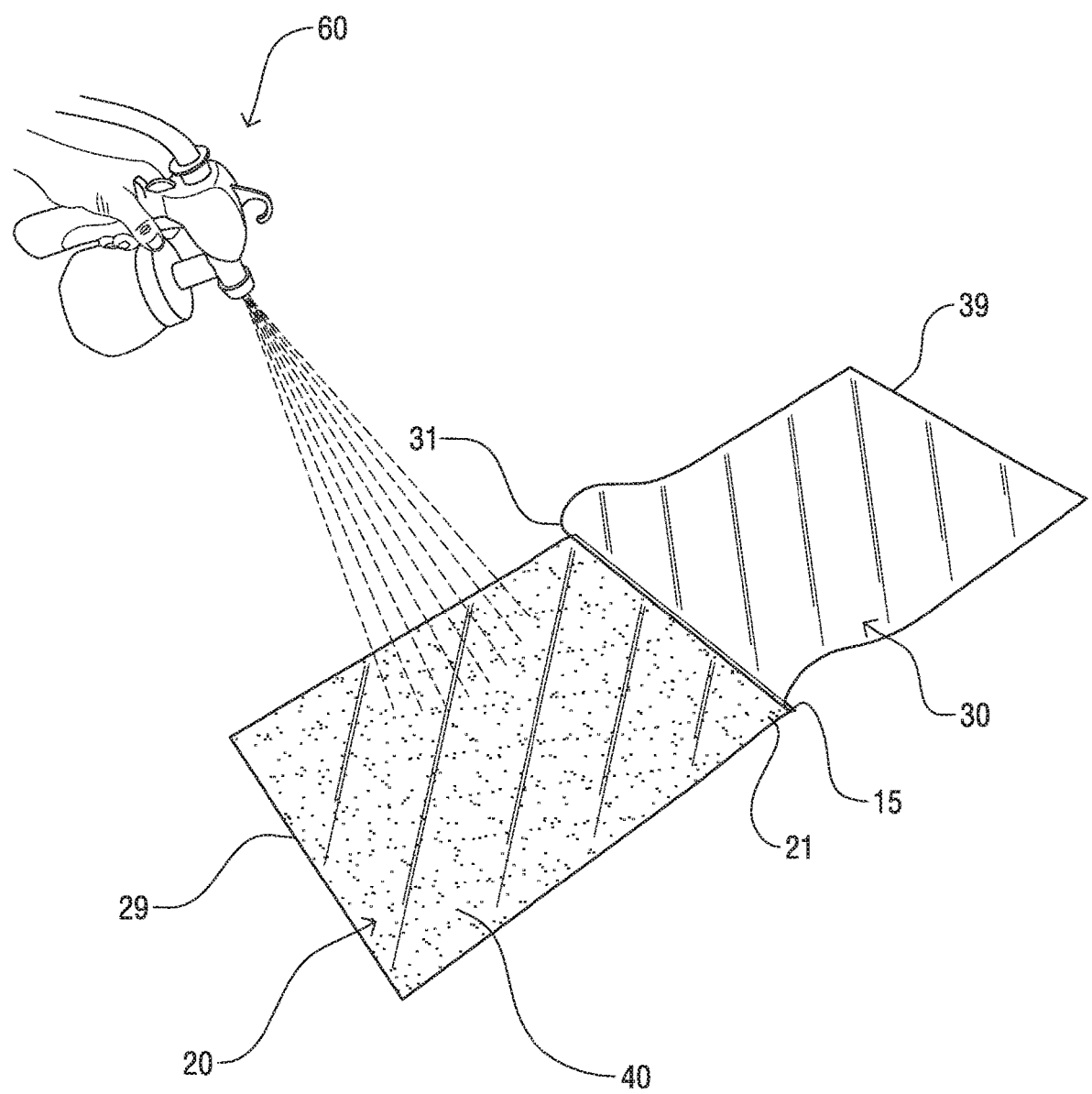
FIG. 3 is a perspective view of an embodiment of the phosphorescent writing sheet of the present invention showing a further step in one aspect of the creation of the writing sheet.

FIG. 3 shows the pouch opened as in FIG. 2, but with the phosphorescent paint 40 being applied onto the substrate sheet 20. Before applying to the substrate sheet 20, the paint 40 may be mixed with water (for water-based paints) or other solvent to achieve the correct dilution for optimal dispersal. After any addition of water or solvent, the mixture is mixed well. The dilution proportions will be determined by factors such as the spray paint gun 60 typed used, the specific type of paint used, and the thickness of the phosphorescent coating required to produce the desired time duration of the glow of the glowing traces.

In general, a thicker coating of phosphorescent paint produces a longer glow duration, and standard acrylic phosphorescent paints produce a longer glow duration than fabric phosphorescent paints. Thus, to achieve the fast disappearance of the glowing trace that is desirable to allow the writing sheet to be quickly re-used over and over again a very thin coat of phosphorescent paint is used. Also, because in testing the glow from acrylic paint has been found to last longer and disappear less efficiently than the glow from fabric paint, fabric phosphorescent paint is preferred. Because some phosphorescent paints have a sustained glow which lasts for up to twelve hours after exposure to light, which is undesirable in this writing sheet to achieve the fast disappearance of the glow, both a thin coat of paint and phosphorescent paint of the fabric type are used. To accomplish this very thin application, it has been found that diluting the phosphorescent fabric paint is desirable, which also reduces the cost of production. For example, when using a standard phosphorescent paint, the paint may be diluted in the ratio of paint to solvent of 1:1 to 3:1. In one aspect of the invention, one part of standard water-based paint is diluted with approximately one-half part of water to achieve the preferred dilution, which is a ratio of paint to water of about 2:1.

Figure 10:
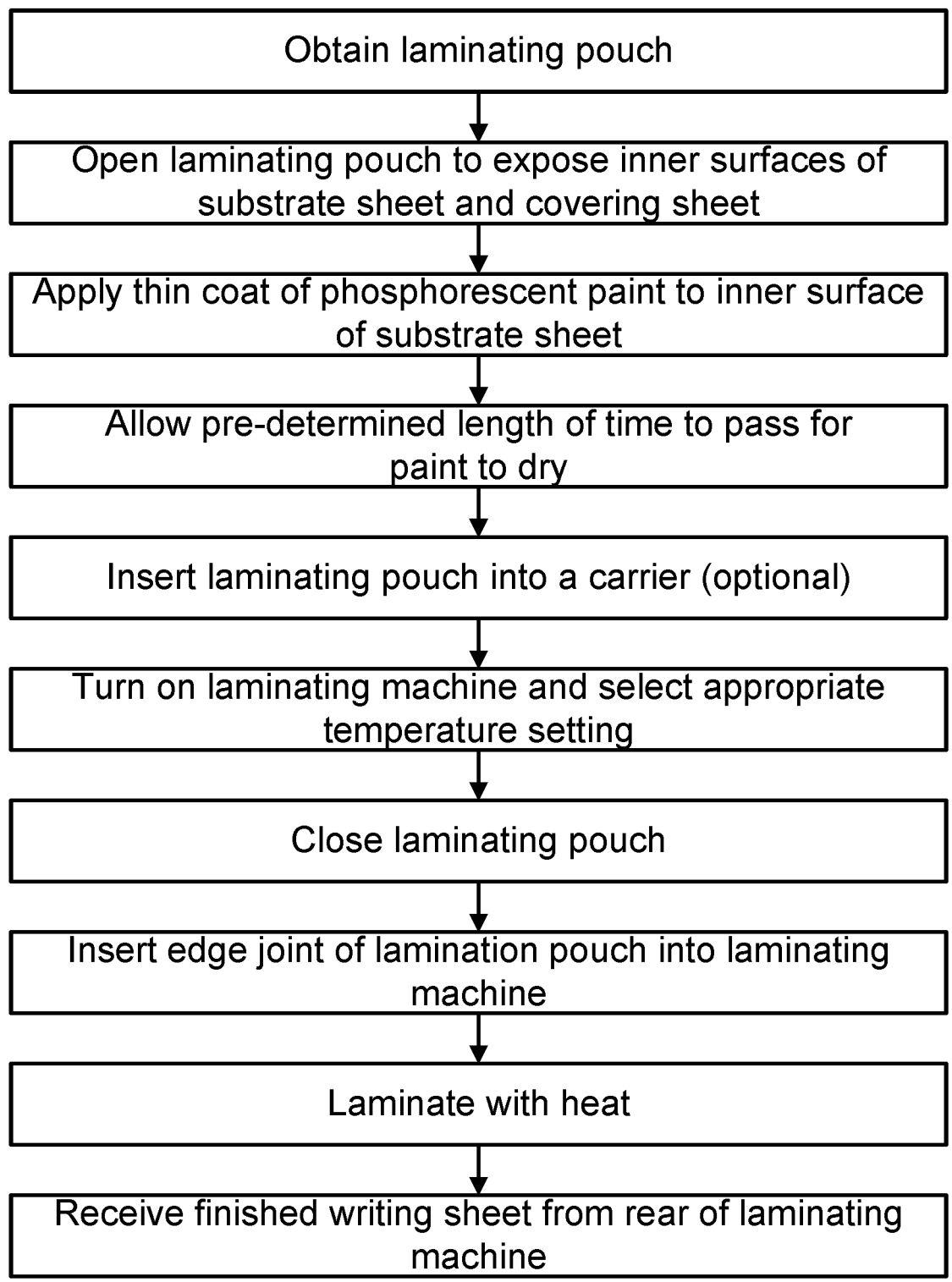
FIG. 10 is a flowchart showing the method steps of one production method using laminating pouches to produce the writing sheet of the present invention.

Referring to the flowchart of FIG. 10, the paint 40 is deposited to form a thin, even coating. The paint 40 may be applied in any conventional manner, such as being sprayed by an air-pressure paint gun 60, as illustrated, or applied in any other conventional paint application method, such as spraying or brushing. A thin layer of paint 40 is dispensed onto at least the inner surface of the substrate sheet 20. Optionally, a thin layer of paint may be dispensed on the inner surfaces of both the substrate sheet 20 and the covering sheet 30. Preferably, the application of the paint 40 is sufficiently thin so that the completed writing sheet 10 is translucent and not opaque. In one aspect, the paint layer is from 0.4 mils to 4 mils. In the preferred aspect, the paint 40 is generally equally distributed on the surface, but in some applications for a specific purpose (such as to meet the needs of a game design) it may be desirable to leave a portion or portions of the surface uncoated or to have a thicker concentration of paint in some areas and a thinner concentration in other areas. For example, for a tic-tac-toe game, the cross grids might be left uncoated. Or black lines may be created by black non-phosphorescent paint to give guidance to a student for writing practice.

In one aspect of the invention, a second paint is also applied. The application of a second paint can create a structure that interacts with or guides the user in how or where to draw the traces. For example, for a tic-tac-toe game, the cross grids might be painted with a dark paint. The second paint may be a different type of phosphorescent paint or may be a non-phosphorescent paint. The combination of two types of phosphorescent paint or a phosphorescent paint with a non-phosphorescent paint may provide advantages to the designers of the writing sheet to enhance the educational aspects or to create new and interesting games.

The phosphorescent paint used may be any type of what is commonly known as glow-in-the-dark paint. Typically, phosphorescent paint may be formed from silver-activated zinc sulfide or doped strontium aluminate, but other types of phosphorescent paint as are known, or become known, in the art are within the scope of the invention. In a preferred aspect of the invention, the phosphorescent paint used is diluted fabric paint. In one aspect, a water-based fabric paint is used. In an aspect, fabric paint of the TULIP brand may be used. In a preferred aspect, Plaid® FolkArt® Glow fabric paint in the color neutral is used.

The phosphorescent paint is allowed to dry a pre-determined length of time. The length of time is based at least on the thickness of the layer of phosphorescent paint, the particular type of paint (or paints) used, and the dilution of the paint(s).

Figure 4:
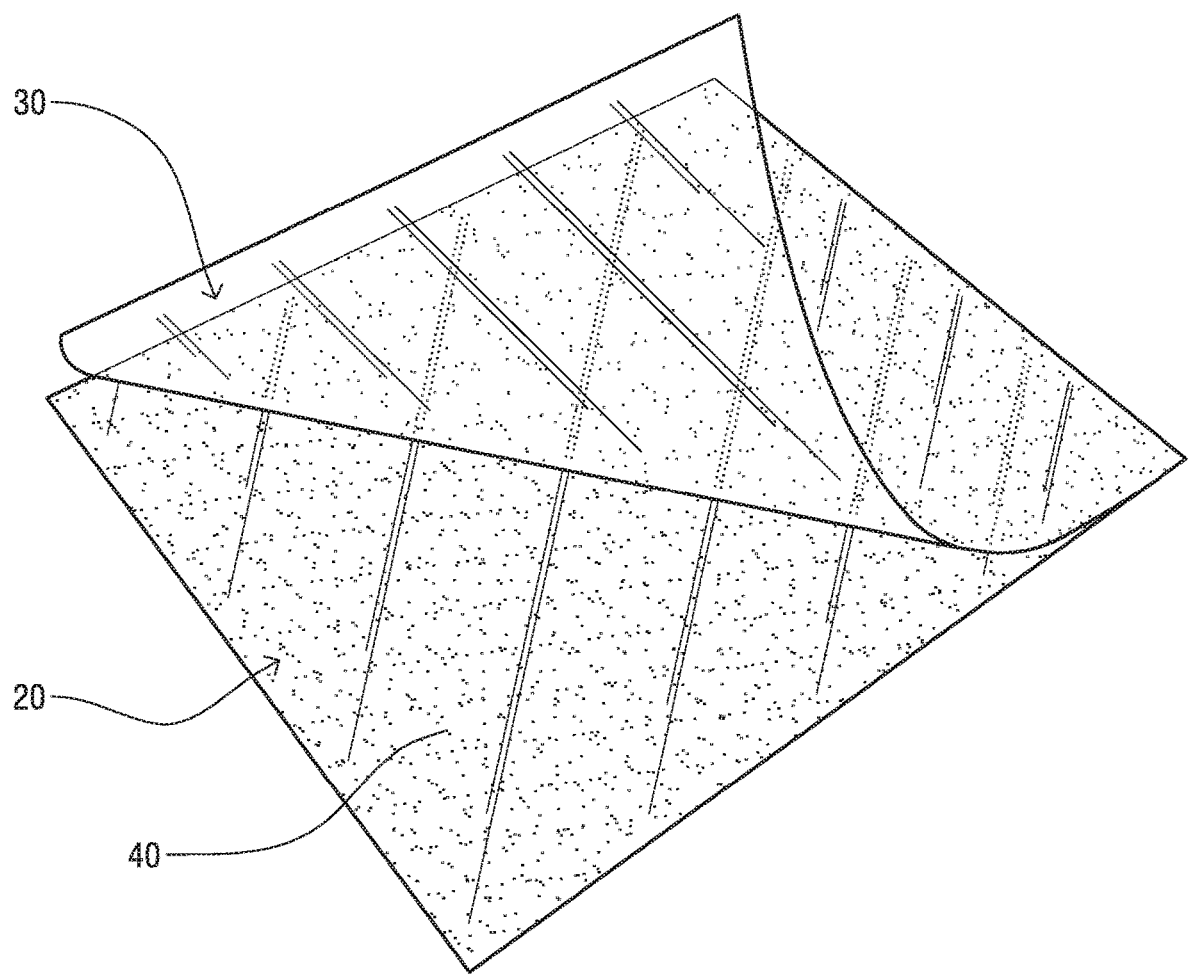
FIG. 4 is a perspective view of an embodiment of the phosphorescent writing sheet of the present invention showing an additional step in one aspect of the creation of the writing sheet.

In the aspect shown in FIGS. 2-4 using lamination pouches, to complete the writing sheet 10 using hot lamination, after the paint 40 deposited on at least the inner surface of the substrate sheet 20 is allowed to dry the pre-determined length of time, the covering sheet 30 is folded onto the paint-coated substrate sheet 20, as seen in FIG. 4, with the paint layer 40 in the middle between the two outer sheets 20, 30. After aligning the two sheets 20, 30, the three-layer construction is placed into a thermal laminating machine heated to the proper temperature and is heated a time based on the specifications of the particular laminating machine. Optionally, the three-layer construction may be placed into a carrier before insertion into the laminating machine. The writing sheet is then complete, as seen in FIG. 5

In the aspect shown in FIGS. 2-4 using lamination pouches, to complete the writing sheet 10 using cold lamination, after the paint 40 dries, a removable liner 51 (FIG. 8) is removed from the inner surface of the covering sheet 30 to expose an adhesive. Then the inner surface of the covering sheet 30 is adhered to the paint-coated surface of the covered substrate sheet 20, as seen in FIG. 5, with the paint layer 40 in the middle between the two outer sheets 20, 30.

In the production method shown in FIGS. 2-4, the size of the laminating pouch determines the maximum size of the writing sheet, but if a smaller writing sheet is desired, the completed writing sheet may be cut into two or more equal or unequal parts to create the size(s) or shape(s) desired.

FIGS. 6-7 illustrate an exemplary production method using hot lamination and roll laminating material. Similarly to the first embodiment, before application of the phosphorescent paint 40, the paint may be diluted. In a preferred aspect, one part of purchased paint is diluted with one-half part of water. The paint 40 may be applied to the substrate sheet 20 in any conventional method, such as by spraying or brushing, to form a thin coat. In one aspect a single phosphorescent paint is applied. In a second aspect a second paint is applied, as discussed above.

As seen in FIG. 6, a thin layer of phosphorescent paint 40 is applied onto an inner surface of the substrate 20. The paint is allowed to dry a pre-determined length of time. Then, as seen in the diagram of FIG. 7 (not to scale), the substrate material 20 carrying a layer of paint 40 is pulled into the laminating machine 50 by roller 55 where it is aligned with the covering laminating material 30. In an exemplary scenario, the paint is applied a distance (several to many feet) from the lamination machine to allow the paint to dry the pre-determined length of time. The covering laminating material 30 is heated by heated roller 59, which causes an interior portion 58 (which may be heat activated glue or a plastic with a lower melting point) of the covering laminating material 30 to melt and adhere to the substrate material 20 with the thin paint layer enclosed between the covering material 30 and the substrate material 20.

FIGS. 6, 8 illustrate an exemplary production method using cold lamination with roll laminating material. As seen in FIG. 6, a thin layer of phosphorescent paint 40 is applied onto a surface of the substrate 20. The paint is allowed to dry the pre-determined length of time. Then, as seen in the diagram of FIG. 8 (not to scale), the substrate material 20 carrying a layer of paint 40 is pulled into the laminating machine 50 by upper roller 55 where it is aligned with the covering laminating material 30. The covering laminating material 30 comprises an inner adhesive layer 53 that is covered by a removable liner 51. The removable liner 51 is removed immediately before use to expose the adhesive layer 53. The upper roller 55 pulls the covering material so that the covering material is aligned with the substrate material. The inner adhesive layer 53 causes the covering material 30 to be adhered to the substrate material 20 with the thin paint layer enclosed between the covering material 30 and the substrate material 20.

In the aspect in which roll laminating film is used, after the two layers of film have been adhered to one another by passing through the lamination machine, the multiple layer material is then cut to the size desired, resulting in multiple writing sheets 10, as seen in FIG. 5. The corners may be rounded if desired.

One or multiple of the writing sheets 10 may be packaged together along with one or multiple ones of the light sources 80. For example, for classroom use, a package of twenty writing sheets 10 may be packaged with twenty light sources 80. The package is compact and easy to transport and store (both on retail shelves and in the limited storage space of a classroom).

Figure 9:
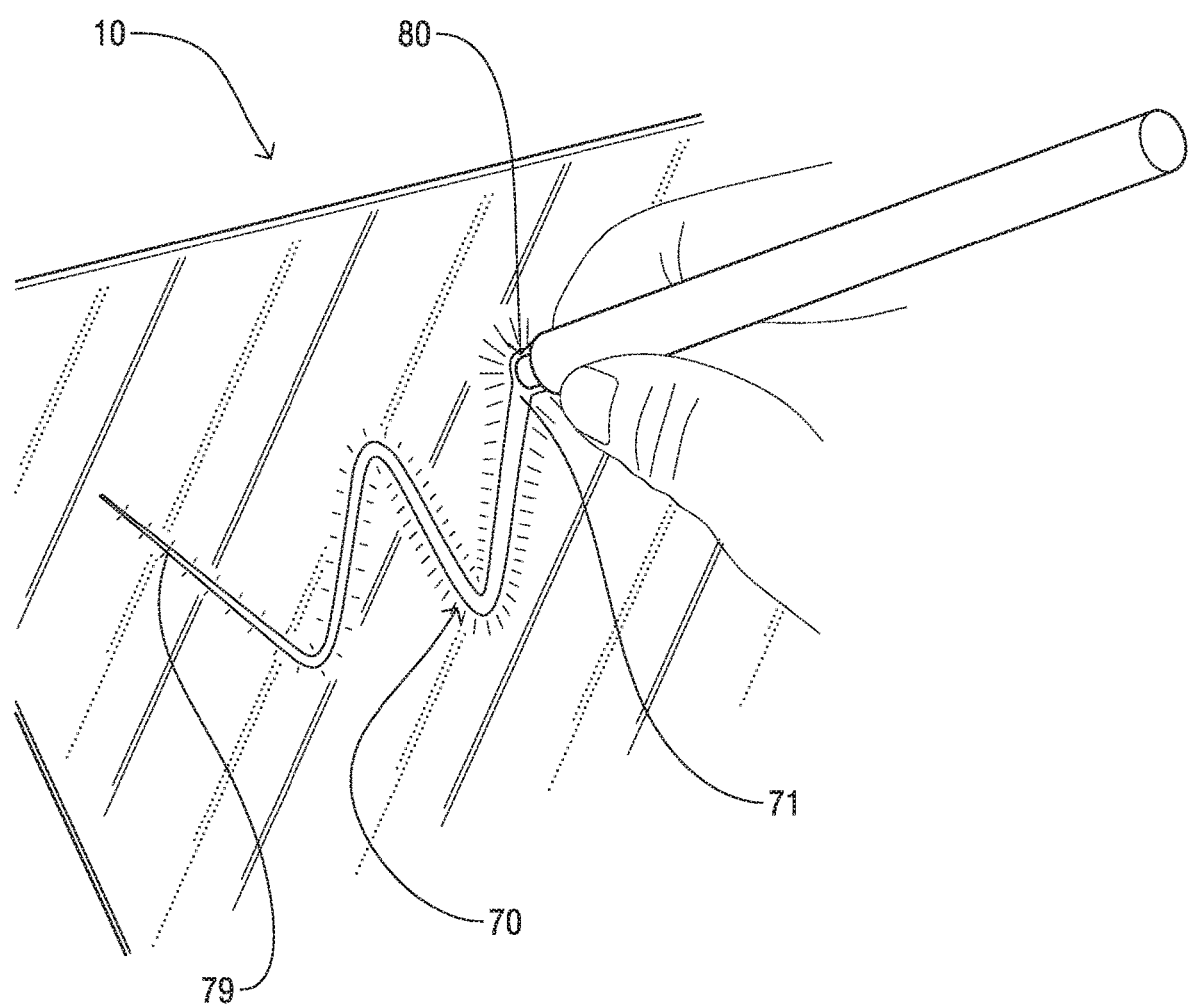
FIG. 9 is a perspective view of an embodiment of the phosphorescent writing sheet and system for creation of glowing traces of the present invention illustrating a light source in one aspect of the invention and illustrating the method of use.

The light source 80 used with the writing sheet 10 in the writing system may be any conventional small handheld light. An exemplary light source 80 is shown as a light emitting diode (LED) finger light in FIG. 1. This finger light is held onto the tip of a finger by an elastic band. The exemplary light source 80 is shown as a penlight in FIG. 9. In a preferred aspect, the light source has a switch that can be turned on when the light is in use and turned off to save the battery after use. In another preferred aspect, the LED light is blue colored. A conventional type of bulb is used, such as a light emitting diode (LED) bulb. In another aspect of the invention, a tablet or mobile phone may be used as the light source; the full light from this type of device can be directed to the writing sheet 10 or a partial light, such as through a designed filter, can be directed onto the writing sheet 10 from the front or the back.

Figure 11:
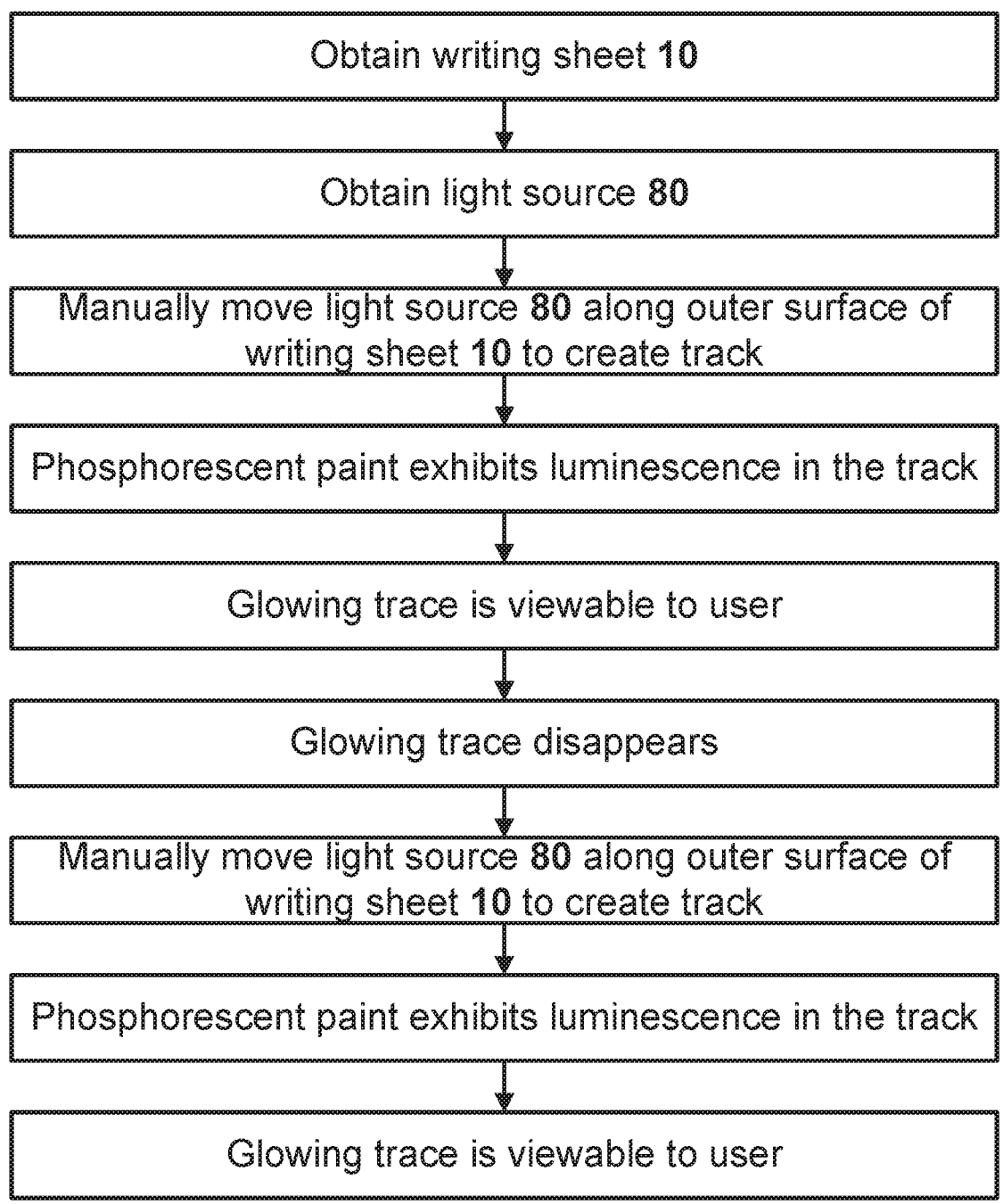
FIG. 11 is a flowchart showing the method steps of one use of the writing sheet of the present invention.

To use the writing sheet 10, as shown in the flowchart of FIG. 11, the user obtains both the writing sheet 10 and a conventional light source 80. The writing sheet 10 may be placed directly on a table or desk. Optionally, the writing sheet 10 may be placed over an accessory sheet or piece that is laid on the table or desk; in this case, the accessory sheet/piece is viewable through the writing sheet 10. The accessory sheet/piece can be, for example, a game board (such as a tic-tac-toe template), an activity sheet (such as to trace letters to learn cursive writing), or other sheet with which the user can interact while using the writing sheet 10 to create glowing traces.

The user turns on the light source 80 and moves the light source 80 over the surface of the writing sheet 10, which creates glowing traces trailing behind the light source 80 with the shape determined by the movement or path of the light source 80. In most aspects of the invention, the writing sheet 10 is reversible, so either the surface of the substrate sheet 20 or of the covering sheet 30 may be used for writing.

The material used to make the substrate sheet 20 and the covering sheet 30 may be any conventional lamination film or laminating pouch material. This material is a plastic. In one aspect, the material may be a single type of plastic. In another aspect, a combination of plastic materials is used. In one aspect in which a combination of plastic materials is used, the laminating film has a harder layer of plastic on the outside and a softer layer of plastic on the inner side. The harder outer layer may be made from polyethylene terephthalate (PET) plastic, and the softer inner layer may be made from ethylene-vinyl acetate (EVA) plastic. In other aspects other combinations, such as a combination of PET plastic, EVA plastic, and polyethylene plastic (PE) may be used. The laminating pouch is typically thicker than the laminating film, but it is not necessarily so. The desired flexibility of the completed writing sheet 10 can be varied based on thickness of the film or pouch and the selection of the types of plastics used for the film or pouch. Clear glossy plastic is preferred, but matte material may optionally be used.

The invention illustratively disclosed herein suitably may be practiced in the absence of any element which is not specifically disclosed herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A writing system comprising:
   a writing sheet comprising a substrate sheet, a covering sheet, and phosphorescent paint; wherein:
   said substrate sheet comprises a substrate inner surface, a substrate outer surface, a substrate first longitudinal proximal edge, and a substrate opposing second longitudinal distal edge, a substrate first lateral edge, and an opposing substrate second lateral edge;
   said covering sheet comprises a covering inner surface, a covering outer surface, a covering first longitudinal proximal edge, a covering opposing second longitudinal distal edge, a covering first lateral edge, and an opposing covering second lateral edge;
   said phosphorescent paint is disposed on said substrate inner surface; and said substrate sheet is permanently adhered to said covering sheet with said phosphorescent paint disposed between said substrate sheet and said covering sheet; and an LED light source configured to be manually run along said substrate outer surface or said covering outer surface, whereby said phosphorescent paint is caused to phosphoresce to create a glowing trace.

2. The writing system as recited in claim 1, wherein:
said substrate sheet comprises a sheet of laminating plastic;
said covering sheet comprises a sheet of laminating plastic; and
said substrate first longitudinal proximal edge is fixedly attached to said covering first longitudinal proximal edge at an edge juncture thereby forming a laminating pouch configured to receive said phosphorescent paint.

3. The writing system as recited in claim 2, wherein said laminating pouch comprises a heat-sealed pouch enclosing a layer of said phosphorescent paint.

4. The writing system as recited in claim 1, wherein said phosphorescent paint comprises a phosphorescent fabric paint.

5. The writing system as recited in claim 4, wherein said phosphorescent fabric paint comprises a water-based phosphorescent fabric paint diluted at a ratio of said water-based phosphorescent fabric paint to water of between 1:1 and 3:1.

6. The writing system as recited in claim 1 wherein:
said substrate sheet comprises a substrate roll of laminating film;
said covering sheet comprises a covering roll of laminating film; and
at least a portion of said substrate roll of laminating film has been sealed via lamination to at least a portion of said covering roll of laminating film with said phosphorescent paint sealed inside.

7. The writing system as recited in claim 1, wherein said phosphorescent paint comprises a water-based phosphorescent fabric paint diluted at a ratio of said water-based phosphorescent fabric paint to water of between 1:1 and 3:1.

8. The writing system as recited in claim 1 wherein said substrate sheet and said covering sheet are formed of a combination of PET plastic and EVA plastic.

9. A method of using a writing system, comprising:
obtaining a writing sheet comprising a substrate material comprising substrate inner surface and a substrate outer surface, a covering material comprising a covering inner and a covering outer surface, and phosphorescent paint; wherein said phosphorescent paint is disposed between said substrate material and said covering material;
obtaining a light source comprising a switch and an LED bulb;
activating the switch of said light source;
selectively positioning said LED bulb against at least one of said substrate outer surface or said covering outer surface to create a track; wherein said phosphorescent paint luminesces in said track to create an optically viewable glowing trace that disappears in a limited length of time; wherein said limited length of time comprises seconds to a few minutes; and
after said limited period of time has passed, again selectively positioning said LED bulb against at least one of said substrate outer surface or said covering outer surface to create a track; wherein said phosphorescent paint luminesces in said track to create an optically viewable glowing trace that disappears in a limited length of time.

10. The method of using a writing system, as recited in claim 9, wherein said limited length of time is under 20 seconds.

11. The method of using a writing system, as recited in claim 10, wherein said phosphorescent paint comprises a phosphorescent fabric paint diluted with water at a ratio of between 1:1 and 3:1.

12. The method of using a writing system, as recited in claim 10, wherein said phosphorescent paint comprises a phosphorescent fabric paint diluted with water at a ratio of 2:1.

13. The method of using a writing system, as recited in claim 10, further comprising placing an accessory sheet below said writing sheet, wherein said accessory sheet is viewable through said writing sheet.

14. A method to create a writing sheet comprising:
obtaining a substrate sheet material suitable for lamination; wherein said substrate sheet material comprises a substrate inner surface, a substrate outer surface, a substrate first longitudinal proximal edge, and a substrate opposing second longitudinal distal edge;
obtaining a covering sheet material suitable for lamination; wherein said covering sheet material comprises a covering inner surface, a covering outer surface, a covering first longitudinal proximal edge, a covering opposing second longitudinal distal edge;
obtaining a phosphorescent paint;
diluting said phosphorescent paint at a ratio of said water based phosphorescent fabric paint to water of between 1:1 and 3:1;
applying a thin layer of said phosphorescent paint to at least one of said substrate inner surface or said covering inner surface; and
laminating said substrate sheet material to said covering sheet material with said thin layer of said phosphorescent paint disposed between said substrate sheet material and said covering sheet material.

15. The method to create a writing sheet, as recited in claim 14, wherein said phosphorescent paint comprises a water-based phosphorescent fabric paint.

16. The method to create a writing sheet, as recited in claim 14, wherein:
said substrate sheet material comprises a sheet of laminating plastic;
said covering sheet material comprises a sheet of laminating plastic;
said substrate first longitudinal proximal edge is joined to said covering first longitudinal proximal edge at an edge juncture to form a laminating pouch; and
said laminating comprises placing said laminating pouch into a heated laminating machine.

17. The method to create a writing sheet, as recited in claim 14, wherein:
said substrate sheet material comprises a substrate roll of laminating film;
said covering sheet material comprises a covering roll of laminating film; and
said laminating comprises sealing said substrate roll of laminating film to said covering roll of laminating film via a laminating machine to seal at least a portion of said substrate roll of laminating film to at least a portion of said covering roll of laminating film with said phosphorescent paint disposed inside.

\* \* \* \* \*